Jan. 5, 1960  W. E. REYNOLDS  2,919,499
READING-TRAINING DEVICE
Filed June 21, 1954  6 Sheets-Sheet 5
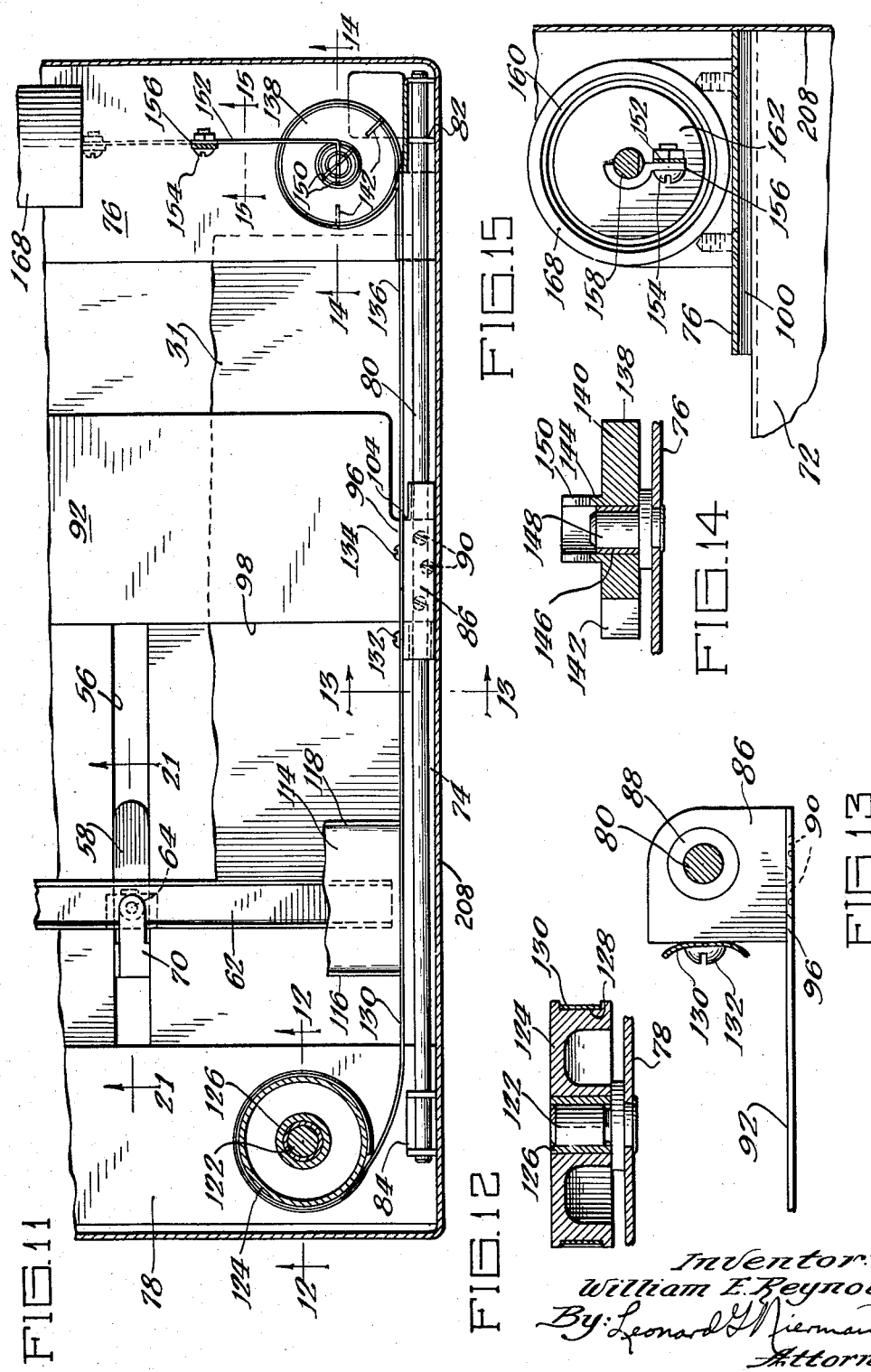

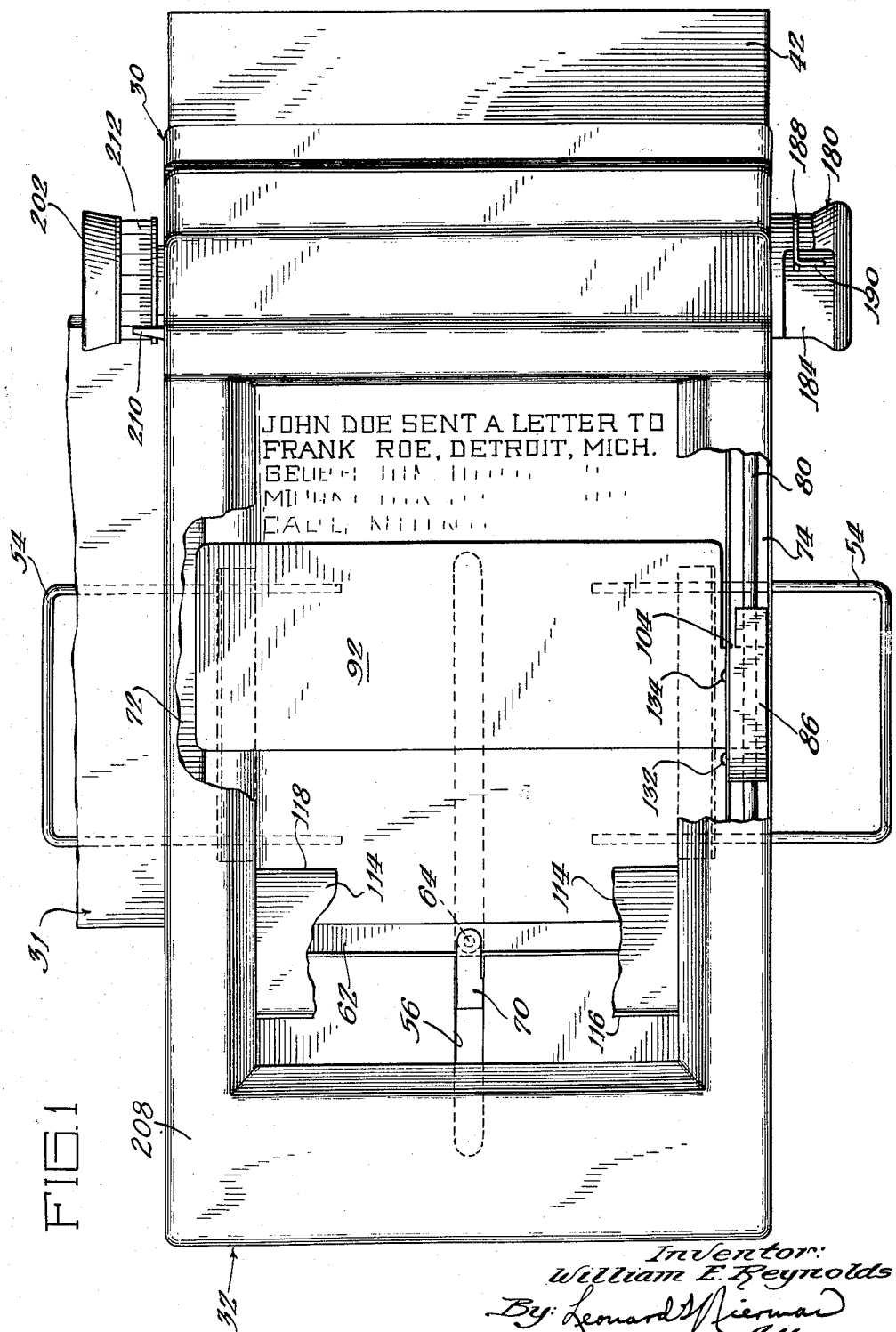

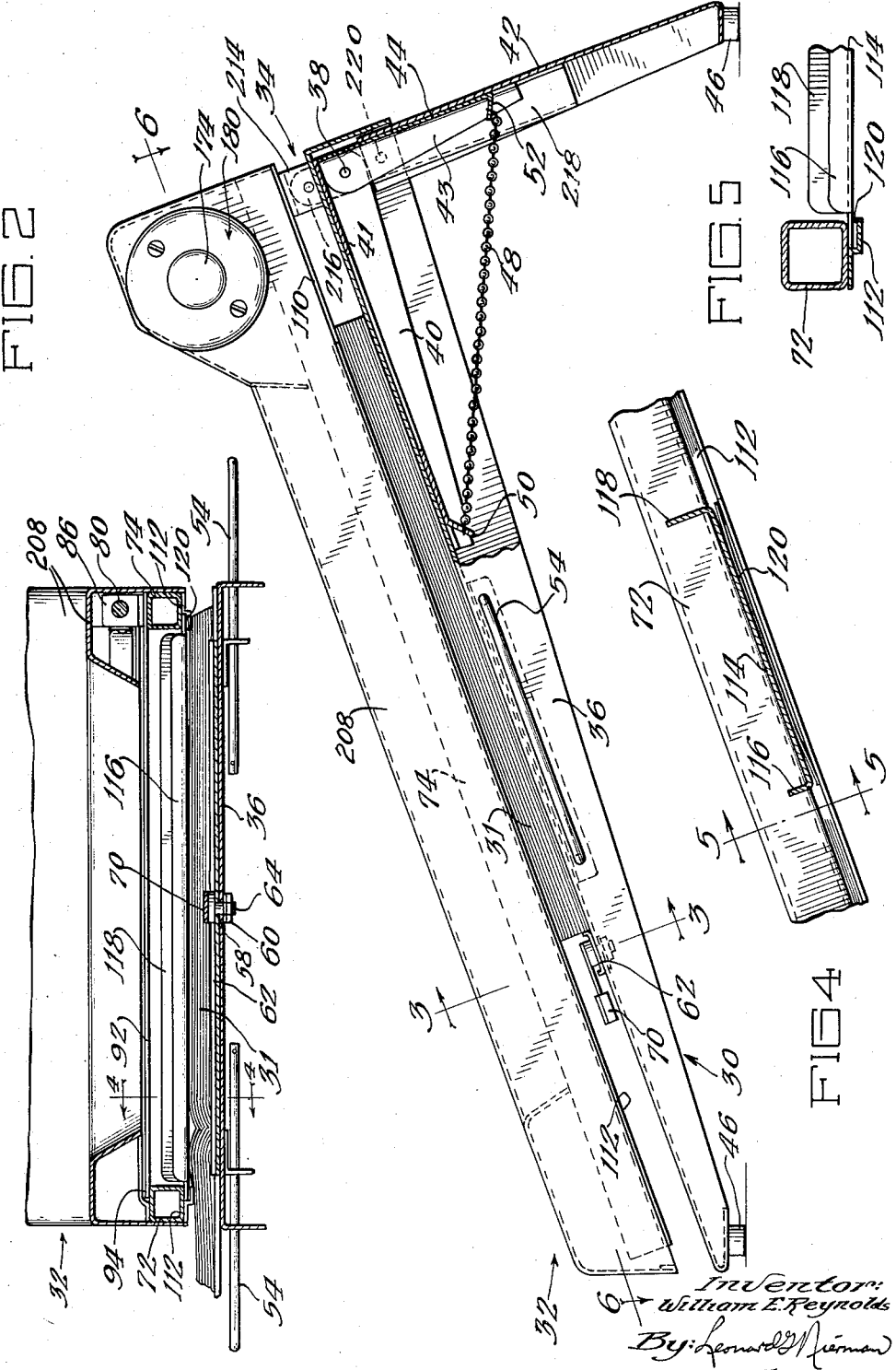

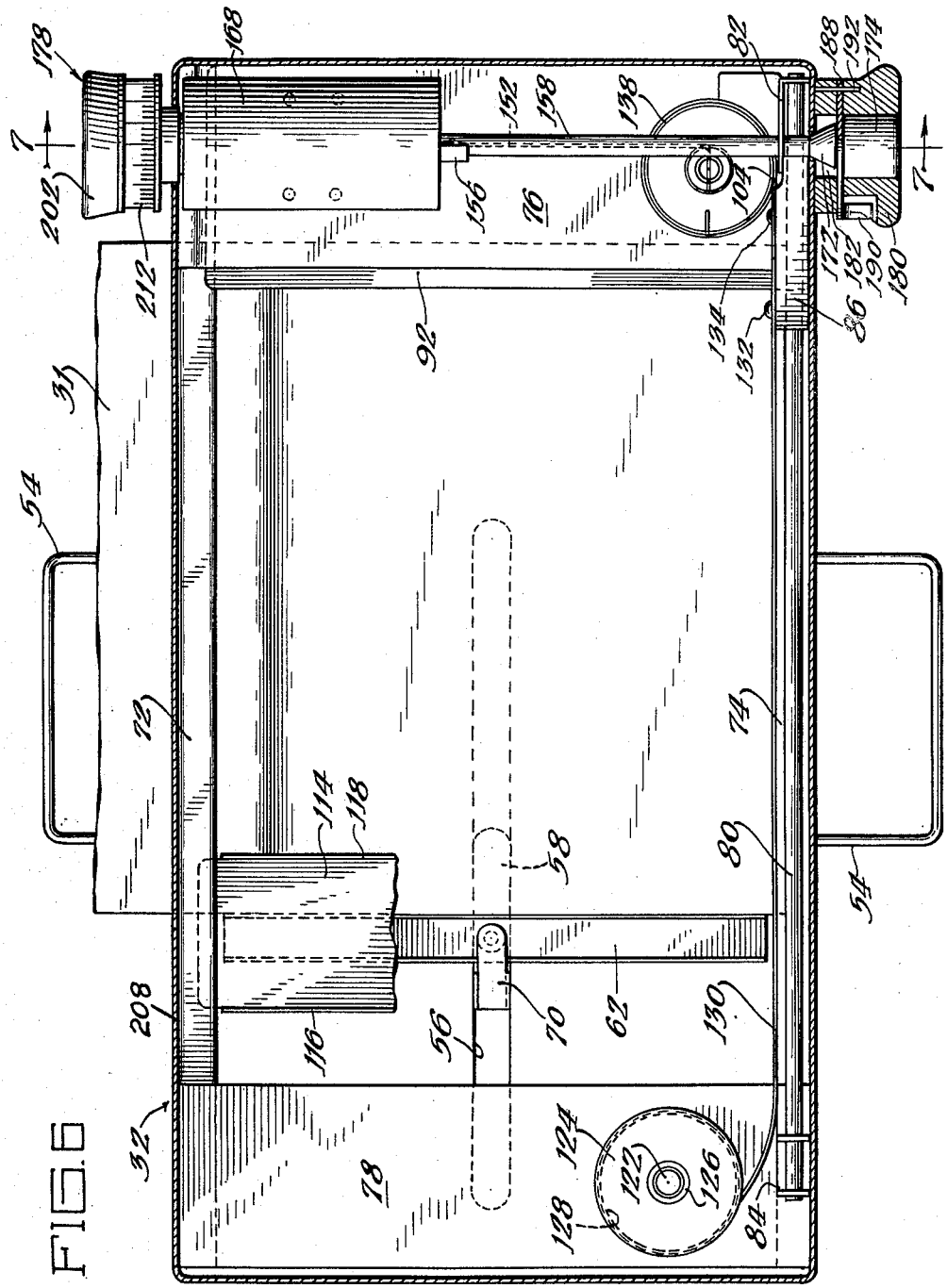

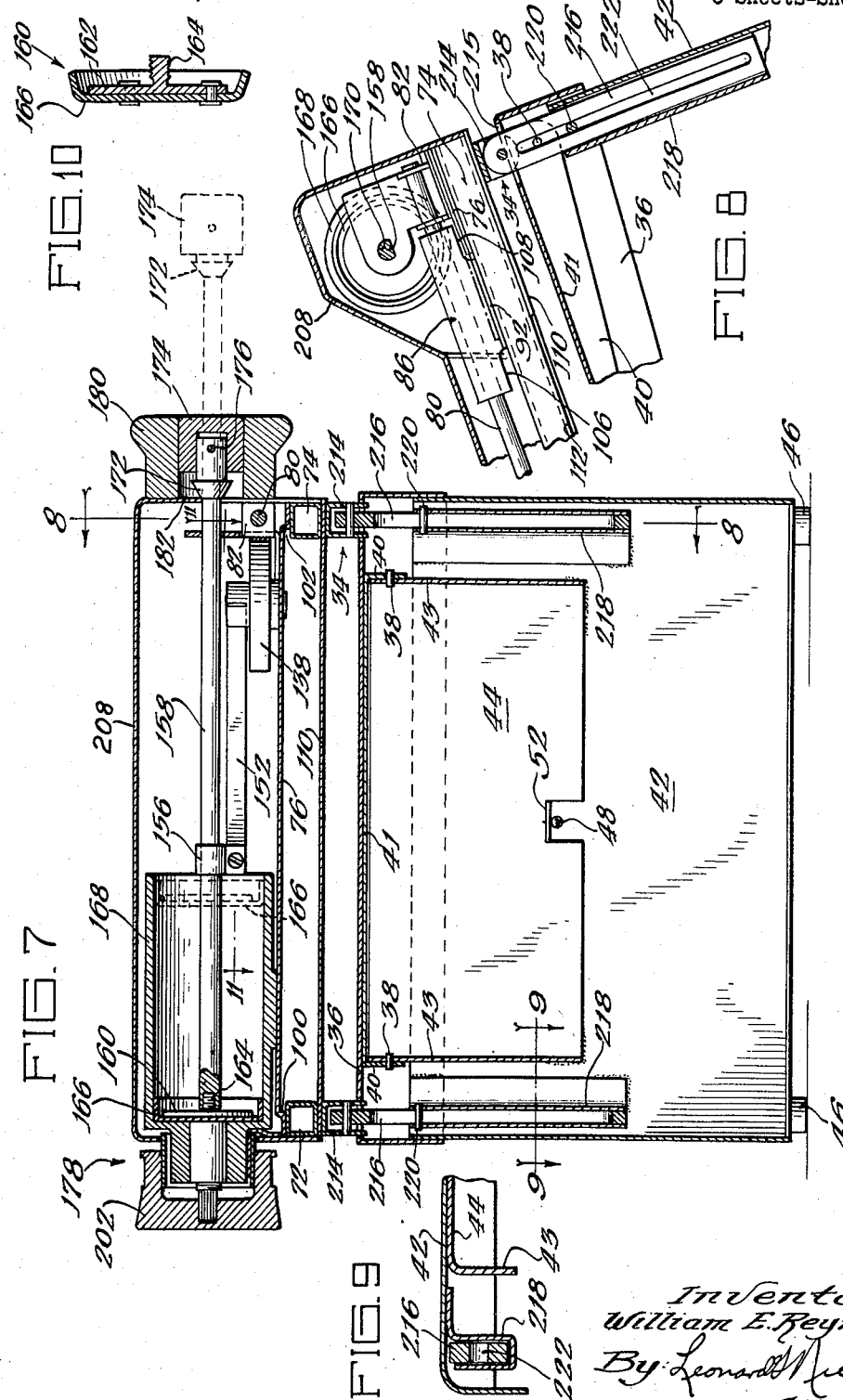

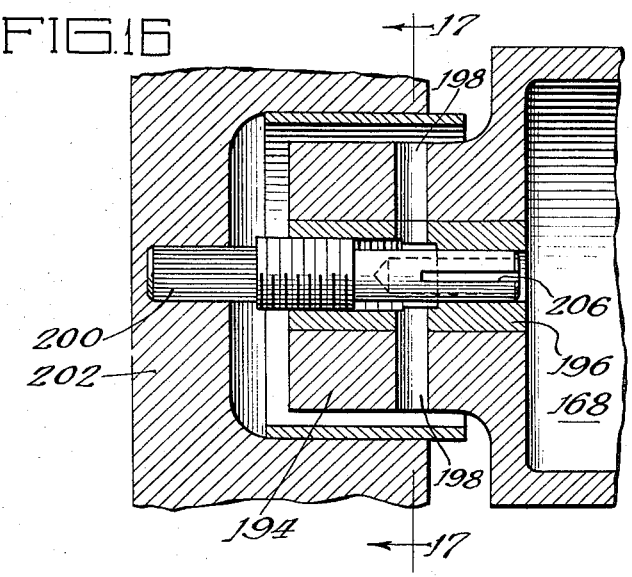
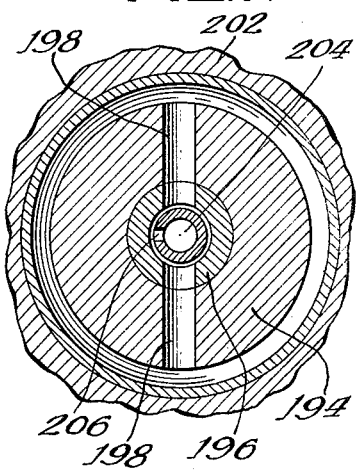
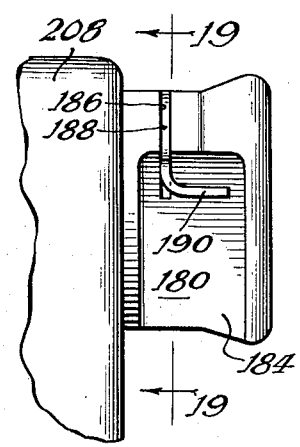
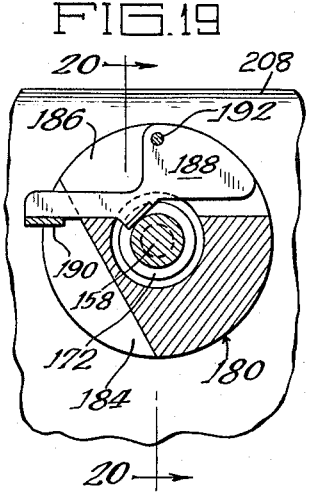
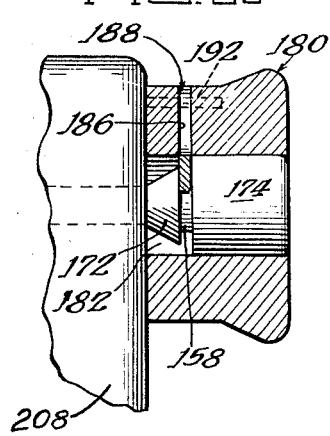
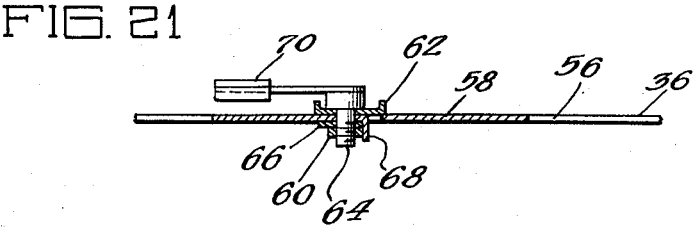

United States Patent Office 2,919,499
Patented Jan. 5, 1960

2,919,499

READING-TRAINING DEVICE

William E. Reynolds, Riverside, Ill., assignor to Elizabeth A. Simpson, Chicago, Ill.

Application June 21, 1954, Serial No. 437,928

19 Claims. (Cl. 35—35)

This invention relates to an improvement in reading-training devices, and more specifically to devices employed for improvement of reading speed of the type which progressively indicate successive lines of printed matter at manually variable constant speeds, preferably masking or covering the lines immediately preceding the line instantaneously being indicated.

It is the principal object of the present invention to provide a reading-training device of the type generally described above which is inexpensive to construct, simple to operate, and yet compact in size and accurate and efficient in operation. Machines for the present purposes heretofore devised have been either relatively complex and expensive to construct, or difficult to use. The devices now in use for this purpose in schools, reading clinics, industrial institutions, and other similar installations, have a number of drawbacks which prevent more widespread use of such machines. In general, the machines now manufactured for these purposes employ, to drive the line-indicating member, such relatively expensive mechanisms as synchronous motors and gear trains, which are capable of producing the required constant speeds, but which require auxiliary speed-adjustment transmissions in order that the speed of the line-indicating member be made continuously variable by manual adjustment, as is required for effective use of such machines.

One way to simplify the mechanism for progressing the line-indicating member over the reading material is by securing the line-indicating member to the piston of a pneumatic cylinder and providing a variable aperture valve on the cylinder to permit speed variations. Prior to the present invention, however, no satisfactory embodiment of this type of structure had been devised, any previously suggested being inordinately bulky and also being excessively susceptible to speed changes due to frictional effects, as well as not permitting mounting of the book or other reading material being used in a normal and comfortable reading position.

In addition to the requirements of constancy of speed of the line-indicating member and ready variability of such constant speed over a wide range, such machines must be adaptable to be simply and conveniently used with a large variety of reading materials, including various sizes of books and magazines, so that training and practice with the machines may be done with reading materials which are readily available and particularly adapted to the needs and background of the user, rather than with reading materials restricted to any particular form, such as cards or single sheets. Heretofore, this requirement of adaptability to a large variety of types of reading material has been met either by providing relatively complex adjustments for reading material size and thickness, the complexity existing both from the standpoint of construction and of utilization of the machines, or by requiring extreme care by the user in preserving the relative positions of the stroke of the line-indicating member and the material being read, even when the machines are employed with successive pages of the same book or other reading materials. The present invention provides a structure for adjusting for dimensional variations of reading materials which is not only simple to construct but is additionally simple to operate, being completely automatic as regards adjustment to varying thicknesses of reading material, as in going from one portion of a book to another.

The structure of the reading device of the present invention also is advantageous in that the construction employed makes the machine compact and portable, without sacrificing efficiency and convenience in use.

Other objects and advantages of the invention, and the manner in which they are achieved, will be apparent from the embodiment of the invention illustrated in the drawing and described below.

In the drawing:

Figure 1 is a top plan view of a reading-training device made in accordance with the teachings of the invention;

Figure 2 is a side view in elevation of the device of Figure 1;

Figure 3 is a transverse sectional view taken along the line 3—3 of Figure 2;

Figure 4 is a fragmentary longitudinal sectional view taken along the line 4—4 of Figure 3;

Figure 5 is a fragmentary transverse sectional view taken along the line 5—5 of Figure 4;

Figure 6 is a top view similar to Figure 1, but taken in section along the line 6—6 of Figure 2 and showing the line indicating member in a retracted position;

Figure 7 is a vertical sectional view taken along the line 7—7 of Figure 6;

Figure 8 is a fragmentary vertical longitudinal sectional view taken along the line 8—8 of Figure 7;

Figure 9 is a fragmentary horizontal sectional view taken along the line 9—9 of Figure 7;

Figure 10 is a detail sectional view of a piston constituting a portion of the apparatus;

Figure 11 is a horizontal sectional view taken along the line 11—11 of Figure 7;

Figure 12 is a fragmentary enlarged sectional view taken along the line 12—12 of Figure 11;

Figure 13 is a fragmentary enlarged detail sectional view taken along the line 13—13 of Figure 11;

Figure 14 is a fragmentary enlarged detail sectional view taken along the line 14—14 of Figure 11;

Figure 15 is a fragmentary enlarged detail sectional view taken along the line 15—15 of Figure 11;

Figure 16 is a fragmentary enlarged detail sectional view corresponding to a portion of Figure 7;

Figure 17 is a transverse sectional view taken along the line 17—17 of Figure 16;

Figure 18 is an enlarged fragmentary view of a portion of the device;

Figure 19 is a sectional view taken along the line 19—19 of Figure 18;

Figure 20 is a fragmentary sectional view taken along the line 20—20 of Figure 19; and Figure 21 is a fragmentary sectional view taken along the line 21—21 of Figure 11.

The embodiment of the invention illustrated comprises a book support assembly, generally designated by the numeral 30, adapted to support reading materials, such as a book 31, and a line-indicating assembly 32, which is adapted to be superposed on the reading material supported by the assembly 30, and to indicate successive lines of print thereon at manually variable constant speeds. The relative positions of the book support assembly 30 and the line-indicating assembly 32 are maintained by a linkage, generally designated 34, which is designed to permit the swinging away of the line-indicating assembly from the book support assembly so that reading materials may be readily inserted and removed, and the pages thereof turned.

For convenience and clarity in reading and understanding the following description of the illustrated embodiment of the invention, these elements will be described under the respective headings "The Book Support Assembly," "The Line-Indicating Assembly," and "The Linkage," the mainner of cooperation of these elements also being described.

The book-support assembly

The book-support assembly 30 includes a sheet-metal book support board 36 formed with reinforcing side and end flanges to form a generally rectangular rigid board or plate.

As best seen in Figure 2, pivots 38 connect ears 40 of a plate 41 spot-welded to the under surface of the board 36 to ears 43 on a similar plate 44 spot-welded to a leg plate 42. The forward end of the support board 36 and the outer end of the leg 42 are provided with suitable rubber feet 46. A chain 48 connects tabs 50 and 52 to limit the pivotal motion of the leg 42 with respect to the support board 36 to the point where they are mutually perpendicular. The device is designed to be used, as shown in Figure 2, with the leg so unfolded, to provide a sloping, partially horizontal, support for reading material, but the leg may be folded into the support board for purposes of convenience and compactness in storage and transportation. Extending outwardly from the sides of support board 36 are U-shaped support rods 54 which extend the effective area of the support board for supporting books and the like, but may be telscoped into the support board, being slidable therein, as best seen in Figure 3.

Central of the support board 36, and extending longitudinally thereof, is a slot 56 (Figures 1, 6, and 11). Slidable in, and guided by, the slot 56 is a shoe 58 (see Figures 6 and 21) of a thickness slightly less than that of the support board 36. On the under side of the shoe 58 is a nut 60 and atop the shoe 58 is a transverse channel-shaped bar 62, a bolt 64 cooperating with the nut 60 to clamp the adjacent portion of the support board 36 between the bar 62 and a small transverse member 66, thus securing the assembly in position along the slot. Rotation of the nut 60 and the transverse member 66 are prevented by a bent tab 68 on the shoe 58. The bolt 64 is provided with a thumb lever 70. Rotation of the bolt 64 by means of the thumb lever 70 releases the clamping action so that the assembly may be slid to any desired point in the longitudinal slot 56 and locked by restoration of the lever 70 to its original position. The bar 62 constitutes a guide or support for the lower end of the book or other reading material (see Figure 2), the sliding of the bar 62 constituting an adjustment for properly positioning reading materials of various heights relative to the stroke of the line-indicating member later to be described. The bar 62 is secured as by welding to the shoe 58, and is thus at all times held in exact perpendicular relation to the longitudinal slot 56 and parallel with the straight edge of the line-indicating member.

The line-indicating assembly

The line-indicating assembly 32 comprises a generally rectangular frame including square tubing side pieces 72 and 74, secured as by welding to upper and lower end plates 76 and 78. Above and parallel to the right-hand side piece 74 extends a guide or slide rod 80 supported in brackets 82 and 84 mounted on the top and bottom plates 76 and 78 respectively. Slideable on the guide rod 80 is a longitudinally apertured slide bar 86 (best seen in Figures 11 and 13) lined with a bushing 88 of nylon or other similar bearing material.

Secured to the under surface of the slide bar 86 by screws 90 (Figure 11) is a line-indicating member or shutter 92. The line-indicating member 92 is a substantially rectangular flat plate extending transversely substantially all the way across the frame, the left hand end 94 resting slideably on the left side member 72 of the frame (Figure 3), and the right hand end having a tongue 96 secured to the under surface of the slide bar 86 (Figures 11 and 13) as described above. The line-indicating member 92 has a straight lower edge 98 adapted to indicate successive lines of printed matter and is of a depth or height sufficient to mask off a substantial amount of material immediately above the edge 98 so as to prevent re-reading thereof. The line-indicating member 92 is maintained perpendicular to the side members 72 and 74 by the rigid connection to the bar 86, the side members and the bar thus constituting a guide assembly extending longitudinally of the book support assembly and engaging the line-indicating member. It will be noted (Figure 7) that the upper end plate 76, which also has its extreme outer ends resting on the side pieces 72 and 74, is vertically offset at the extreme ends, as indicated at 100 and 102, to permit the line-indicating member 92 to slide in under the end plate 76 when the line-indicating member 92 is at the top of its path or stroke. For the same purpose, the assembly of the bar 86 and the line-indicating member 92 is formed with a notch or slot at 104 (Figures 1 and 11) and the ends of the under side of the bar 86 are cut away or offset at 106 and 108 (Figure 8).

At the upper or rearmost end of the assembly, substantially in register with the upper end plate 76, is a plate 110 (Figures 7 and 8) secured to the under surfaces of the side frame members 72 and 74. Extending along the balance of the length of the under surfaces of the side frame members 72 and 74 are offset tracks or rails 112, best seen in Figures 4 and 5. In the inwardly facing longitudinal slots thus formed slide the ends of a transverse plate 114, on the central portion of which are formed reinforcing flanges or ribs 116 and 118. Flat slightly arcuate springs 120 are secured to the under surfaces of the ends of the plate 114 and are under compression to create substantial friction in the sliding of the plate 114 along the slots formed by the rails 112 and the frame members 72 and 74. The bar 114 may thus be readily moved upward or downward along the frame, but will remain in any desired position.

The plates 114 and 110 serve as lower and upper hold-down members for the pages of the book or other reading material being employed. In use, the line-indicating assembly 32 is placed over a book on the book support assembly 30 with the upper hold-down plate 110 resting on the upper margin of the book, and the lower hold-down plate 114 is positioned to rest on the lower margin of the book, the book being held in proper longitudinal position by the guide or bar 62 on the support assembly. The holding down of the pages at the top and bottom end in this manner prevents the jamming of the machine or tearing of pages or reading materials which sometimes occurred with previous machines due to curling or bulging of the pages into the path of the line-indicating member.

Rotatably mounted on a shaft or post 122 extending from the lower end plate 78 adjacent to the lower end of the slide rod 80 is a spool or drum 124 (Figures 6, 11 and 12) lined with a bearing or bushing 126 of nylon or similar material. The spool 124 has a circumferential groove 128 of rectangular cross section and the inner end of a pre-stressed resilient tape or spring 130 is seated tightly in this groove. The outer end of the tape 130 is secured to the bar 86 by a suitable screw 132.

As will be understood by those skilled in the art, the pre-stressed resilient tape 130, which is uniformly stressed along its length so that it naturally would, but for the presence of the spool 124, coil to a radius less than that of the spool 124, and which is also pre-stressed or bent transversely (see Figure 13), constitutes in essence a constant-force spring, being so designed that the force versus deflection characteristic is constant. Such springs are now familiar to persons skilled in the mechanical arts, having been described by Cook & Clarke in Product Engineering, July, 1949 and other places. The pre-stressing of the tape or spring to a smaller radius than the spool upon which it is wound, together with the transverse pre-stressing, or bending, act to provide a constant force in the direction such as to wind the tape upon the spool, the entire force being exerted by the portion of tape 130 closely adjacent to the portion which is wound upon the spool. The tape 130 may exercise a force of about 250 grams, making friction variations negligible in effect.

Affixed to the slide bar 86 by a screw 134 and extending in the direction of travel thereof is an elongated flexible tape 136 (Figure 11). Unlike the tape 130, which is resilient and thus exerts a restoring force, the tape 136, is, by the nature of the material or thickness thereof, essentially flaccid or limp, thus exercising essentially no restoring force. A material suitable for the tape 136 is, for example, stainless steel, approximately 4 mils thick.

Rotatably mounted on the upper end plate so as to have the tape 136 tangent thereto is a spool 138 (Figures 11 and 14) having a portion 140 of a first diameter upon which an end of the tape or flexible member 136 is wound, the end of the tape being seated in a radial slot 142, and a second portion 144 of lesser diameter. The spool 138 is lined with a bearing sleeve 146 of brass so as to freely rotate about a post or shaft 148 similar to the post 122. The small diameter portion 144 of the spool 138 is slotted at 150. Wound upon the small portion 144 is a tape 152 of the same general construction as the tape 136, the end of the tape 152 being seated in the slot 150. The extending portion of the tape 152 extends tangentially transversely of the machine or perpendicular to the direction of extension of the tape 136. The outer end of the tape 152 is bolted at 154 to a tab 156 which is welded to an elongated rod 158 which extends above and parallel to the tape 152 (see Figures 7 and 15). To the left-hand end of the rod 158 is secured a piston (Figure 10) designated 160, comprising a metal support plate 162 having a threaded shank 164 securing it to the rod 158 and a leather cup or washer 166 riveted to the face thereof. The piston 160 is reciprocable in a cylinder 168 mounted at the left-hand end of the plate 76. The outer or right-hand end of the rod 158 passes through and is supported by a guide aperture 170 in a portion of the bracket 82 (Figure 8), the outer end of the rod 158 being flattened on one side to correspond with the shape of the guide aperture 170. Near the outer or right-hand end of the rod 158 is a cone-shaped flare or protusion 172. Affixed to the outer end of the rod 158 is a handle or button 174, secured in position by a pin 176 (Figure 7).

The mechanism thus far described operates in the following manner: the pre-stressed coiled resilient spring or tape 130 exercises a constant force on the slide bar 86, irrespective of the position of the line-indicating member or shutter 92. The load on the spring or tape 130, which governs the speed at which the shutter 92 is progressed, is the vacuum created within the cylinder 168, transmitted through the tapes 136 and 152. Air is admitted to the cylinder 168 through a variable valve or aperture assembly generally designated 178, and later to be described in detail. Thus the line-indicating member or shutter 92 is moved downwardly over the reading material at a substantially constant speed which is determined by the setting of the variable valve assembly 178, which provides a manually variable brake. As the shutter 92 is driven downwardly, the rod 158 is driven outwardly to the right. When the line-indicating member 92 has reached the bottom of the reading material being employed, the machine may be reset for the reading of a subsequent page by pressing inward (to the left) the knob 174 to drive the piston 160 into the cylinder. The leather cup or washer 166 serves in this portion of the operation as an automatically opening valve permitting the escape of air from the cylinder so that the air compression in the cylinder presents a negligible load, the force required to be exercised on the rod 158 being merely that required to unwind the spring or tape 130 from its spool. The speed reduction which occurs by reason of the coupling through the tapes 136 and 152 on the spool 138 permits resetting of the line-indicating member through its entire stroke with a relatively short resetting motion, the ratio of the stroke of the piston to the stroke of the line-indicating member being the ratio of the diameters.

In the illustrated embodiment, there is provided a knob or boss 180 mounted on a cover assembly later to be described, the knob or boss 180 (detailed in Figures 18, 19 and 20) being centrally apertured at 182 to pass the rod 158 and also to receive the button 174 when the line-indicating member 92 is in its uppermost position. A portion of the knob 180 is cut away or recessed at 184 to receive the thumb of the user. When the thumb is placed on the knob at 180, the line-indicator may be reset to its uppermost position by pressing in the handle or button 174 until the piston is fully inserted into the cylinder, corresponding to the position of the button 174 wherein it is nested into the knob 180. The knob 180 is slotted at 186 to receive a latch plate 188 which extends into the cut-away or recess 184 and has a handle or actuating portion 190 formed thereon. The latch plate 188 is pivoted on the knob 180 by a pin 192. As the handle 174 is driven inward during the resetting operation, the cone-shaped flare on the rod 158 strikes the plate 188 and rotates it about the pivot pin 192 until the flare 172 passes beneath the pate 188, at which point the latch plate 188 falls back toward the axis of the rod 158. When pressure is released from the handle or button 174, the moving portion of the assembly is latched or locked into position by engagement of the latch plate 188 against the outer surface of the cone-shaped flare 172 (best seen in Figure 20). Thus the line-indicating member is latched into its uppermost position until released by manual pressure against the actuating portion or handle of the latch plate 188 by the user.

The variable aperture valve 178 (detailed in Figures 16 and 17), which controls the speed of the shutter, is assembled on a boss 194 formed on the left-hand end of the cylinder 168. The boss 194 is centrally apertured, a sleeve 196 being tightly forced into this aperture. The outer end of the sleeve 196 is internally threaded, and the end of the sleeve 196 which communicates with the cylinder 168 is of reduced internal diameter. Radial apertures 198 connect the chamber thus formed in the central portion of the interior of the sleeve 196 with the atmosphere. Threaded into the outer portion of the sleeve 196 is a valve member 200 provided with a suitable operating knob or dial 202. The inner end of the valve member 200 is axially bored at 204 to form a longitudinal air passage or tube sealed at the outer end. The wall of the tube thus formed is longitudinally slotted at 206. The inner end or tube portion of the valve member 200 slides tightly in the constricted end portion of the sleeve 196. The constriction or aperture connecting the interior of the cylinder 168 with the exterior atmosphere is thus the portion of the slot 206 which extends outwardly beyond the constricted inner end of the sleeve 196. Thus manual control of the constant speed at which the line-indicating member is progressed over the reading material may be accomplished with great precision by rotation of the speed control knob 202.

A sheet-metal cover 208, to which the knob or boss 180 is affixed, as mentioned above, is fitted over the mechanism described, leaving exposed only the knob or boss 180 and the speed adjustment knob 202. A pointer 210 (Figure 1) on the cover 208 cooperates with calibration markings 212 on the knob 202 to provide visual indication of the shutter speed. The cover 208 is constructed with upper and lower portions and side portions corresponding to the portions of the described mechanism and frame, thus leaving unobstructed the central portion of the line-indicating assembly, through which the book or other reading material on the book support is viewed.

The linkage

Depending from the upper portion of the upper hold-down plate 110, and thus from the upper peripheral portion of the guide or line-indicating assembly, are ears or brackets 214 (Figures 2, 7 and 8). The book support board 36 is apertured to pass the brackets 214, so that the line-indicating assembly may lie flush on the book support board when the machine is not in use, or when it is being used with single cards or sheets.

Pivoted on the pivotal axis defined by the brackets 214 are flat elongated bars or links 216. Secured to the leg 42, as by welding, are rectangular chutes or guides 218 confining the links 216 to longitudinal sliding motion. The links 216 are prevented from being completely removed by pins 220, which cooperate with a longitudinal slot 222 in each of the links 216 to limit the outward motion of the links in the guide.

The pivot points of the links 216 on the ears 214 are so located that when the line-indicating assembly rests directly on the book support board, the pivotal axes of the leg 42 and the links 216 are in alignment. In this position, therefore, the leg 42 may be folded up into the support board 36 without interference by the links 216, which are thus likewise folded compactly. The folding of the leg 42 in this matter also locks the line-indicating assembly to the support assembly, relative longitudinal motion being prevented by the seating of the ears 214 in the apertures 215 in the support board.

The linkage connecting the guide or line-indicating assembly to the support assembly also provides automatic adjustment of the spacing between the support board and the line-indicating assembly and maintains the relative longitudinal position of the line-indicating assembly with respect to a book on the book support irrespective of the thickness of the book when the device is in use. The chutes 218 constitute tracks maintaining the links 216 perpendicular to the book support and provide a sliding connection for relative translational motion confined to the perpendicular direction, the line-indicating assembly being pivoted with respect to the track and the support assembly only on the pivotal axis defined by the brackets 214.

In placing a book or other reading material on the support board (the leg of course being in the operating or unfolded position), the lower end of the line-indicating assembly is first lifted or swung away from the support board to permit access thereto, and the book, opened to the desired page, is inserted with its lower edge resting against the bar 62, the support rods 54 being extended if required. The bar 62 is unlocked by manipulation of the thumb lever 70 and is slid to the longitudinal position where the upper hold-down plate rests on the margin at the top of the reading material. When the line-indicating assembly is released, it will be seen that it rests upon the book or other reading material, and is thus maintained parallel to the reading material and the support board upon which the reading material rests. The confinement of the link 216 to perpendicular sliding motion with respect to the support board assures constancy of the relation of the position of the line-indicating assembly to that of the reading material. Thus various portions of the same book may be used, thus producing varying thicknesses, without any necessity whatever for making adjustment of the top or bottom hold-down plate in order to assure that the hold-down plates (the bottom hold-down plate having been previously adjusted to cover the lower margin of the reading material) continue to rest on the top and bottom margins of the books, and that the path of the line-indicating members has the same relation to the printed material irrespective of which portion of the book is being used.

Obviously, persons skilled in the art will readily devise many modifications of the embodiment of the invention illustrated. Many aspects of the teachings of the invention may be employed in the design and construction of reading devices far different in appearance and details of constructions from that illustrated, but nevertheless incorporating the essence of the invention. Accordingly, the scope of the patent granted to protect the invention shall not be limited by the particular embodiment illustrated in the drawing and described above, but shall be limited only by the appended claims.

What is claimed is:

1. In a reading-training device comprising a line-indicating member and means for progressively driving the line-indicating member over successive lines of printed material, the improved construction wherein said driving means includes a first elongated flexible member, means for affixing the line-indicating member to said first flexible member to move therewith, a spool having a portion of a first diameter upon which an end of the first flexible member is wound and a second portion or lesser diameter, a second flexible member having one end wound upon the second portion of the spool, a cylinder, a valve of variable aperture on the cylinder, a piston reciprocable in the cylinder and affixed to the second flexible member, and constant-force means for unwinding the first flexible member from the spool to drive the line-indicating member at a constant speed depending on the setting of the variable valve, so that the ratio of the stroke of the piston to the stroke of the line-indicating member is the ratio of the diameters of said portions of the spool.

2. In a reading-training device comprising a line-indicating member and means for progressively driving the line-indicating member over successive lines of printed material, the improved construction wherein said driving means includes a first elongated flexible member, extending in the direction of travel of the line-indicating member, means for affixing the line-indicating member to said first flexible member to move therewith, a spool having a portion of a first diameter upon which an end of the first flexible member is wound and a second portion of lesser diameter, a second flexible member having one end wound upon the second portion of the spool, a cylinder, means for mounting the cylinder transverse to the direction of the line-indicating member, a valve of variable aperture on the cylinder, a piston reciprocable in the cylinder and affixed to the second flexible member, and constant-force means for unwinding the first flexible member from the spool to drive the line-indicating member at a constant speed depending on the setting of the variable valve, so that the ratio of the stroke of the piston to the stroke of the line-indicating member is the ratio of the diameters of said portions of the spool.

3. A reading device comprising a substantially rectangular frame having side and upper and lower end members, a straight-edged line-indicating member extending transversely of the frame and adapted to move from the top to the bottom of the frame, spools rotatably mounted at the ends of the frame on rotational axes perpendicular to the plane of motion of the line-indicating member, elongated members wound upon the spools and having ends extending along one of the side members, and means interconnecting said extending ends including a connection to one end of the line-indicating member, the other end of the line-indicating member being slidingly engaged in and guided by the other side member.

4. In a reading device comprising a book support assembly adapted to support a book and a frame assembly overlying the book support assembly and adapted to rest upon a book placed on the support assembly while exposing the pages thereof to view, the improved construction characterized by a leg member pivoted on the book support assembly to fold into and from the assembly to provide a sloping support for a book thereon, a link member pivoted on the frame assembly, and means on the leg member for confining the link member to longitudinal sliding motion with respect to the leg member, the pivotal axes of the leg member on the book support assembly and of the link member on the frame assembly being in alignment when the frame assembly rests directly on the book support assembly, thus permitting folding of both the leg member and the link member for storage of the device.

5. In a reading device comprising a book support assembly, a rectangular frame assembly overlying the book support assembly, a line-indicating member having a straight edge extending transversely of the frame assembly, and means for driving the line-indicating member downwardly over the frame assembly to indicate successive lines of print, the improved construction including a transverse positioning member adapted to be placed against the lower edge of a book, means for mounting the positioning member on the book support for sliding longitudinal motion thereon, a hold-down member adapted to rest on the margins of pages of a book, said hold-down member being mounted on the frame assembly for sliding longitudinal motion thereon, and a connection between a portion of the book support assembly and an overlying portion of the frame assembly comprising a track perpendicular to one of said assemblies, means for confining the translational motion of the other assembly to the direction of the track, and means for pivoting said other assembly with respect to said last named means.

6. In a reading-training device comprising a line-indicating member and means for progressively driving the line-indicating member over successive lines of printed material, the improved construction including a first elongated flexible member extending in the direction of travel of the line-indicating member, means for affixing the line-indicating member to said first flexible member to move therewith, a spool having a portion of a first diameter upon which an end of the first flexible member is wound and a second portion of lesser diameter, a second flexible member having one end wound upon the second portion of the spool, a piston and cylinder assembly extending transverse to the direction of motion of the line-indicating member and having a piston member and a cylinder member, one of said members being affixed to the second flexible member, a valve of variable aperture communicating with the interior of the cylinder member, and constant-force means for unwinding the first flexible member from the spool to drive the line-indicating member at a constant speed depending on the setting of the variable valve, so that the ratio of the stroke of the piston and cylinder assembly to the stroke of the line-indicating member is the ratio of the diameters of said portions of the spool.

7. In a reading-training device comprising a straight-edged lined-indicating member, a piston and cylinder assembly having a cylinder member, a piston member, and a variable valve communicating with the interior of the cylinder, a coupling between one of said members and the line-indicating member, and constant force means for moving the line-indicating member over printed matter, the improvement wherein the piston and cylinder assembly is parallel with the straight edge of the line-indicating member and said coupling comprises a first elongated member connected to one of the members of said assembly and extending parallel with said edge, a second elongated member connected to the line-indicating member and extending perpendicular to said edge, and a speed-reducing coupling interconnecting said elongated members, whereby the line-indicating member may be reset in position by a relatively short motion, and the device is compact and portable.

8. In a reading device comprising a line-indicating member and means for driving the line-indicating member downwardly over successive lines of reading material placed thereunder at manually selectable constant speeds, comprising a spool, means for rotatably mounting the spool at one end of the path of motion of the line-indicating members, a constant force spring having one end wound upon the spool and the other end extending therefrom along one side of the path of motion of the line-indicating member, means for securing a lateral end portion of the line-indicating member to the extending end of the spring to be driven thereby, a guide slidingly engaging at least one end of the line-indicating member and confining the motion of the line-indicating member to a path perpendicular to the edge thereof, and means for applying a manually variable braking force directly to the same end portion of the line-indicating member and in alignment with the end of the spring to control the drive speed, so that both the spring and the line-indicating member are reset by the resetting of one of them, and the guide is substantially free of friction caused by torque exerted on the line-indicating member by the drive and braking means.

9. In a reading device having a line-indicating member and means to progress the line-indicating member over reading material at manually variable constant speeds, the improved construction comprising a side member, the line-indicating member extending inward from the side member and being adapted to move from the top portion to the bottom portion thereof, a single pair of spools rotatably mounted at the ends of the side member on rotational axes perpendicular to the plane of motion of the line-indicating member, a tension assembly extending between the spools and having the ends thereof wound upon respective spools and an intermediate portion thereof secured to the line-indicating member, and means acting between the side member and the line-indicating member to maintain the edge of the line-indicating member perpendicular to its path of motion throughout said motion.

10. The reading device of claim 9 wherein at least one end of the tension assembly so wound upon one of the spools comprises a constant force spring, and the device further includes manually variable braking means and means for coupling the braking means to said assembly.

11. In a reading-training device comprising a line-indicating member and means for progressively driving the line-indicating member over successive lines of printed material, the improved construction wherein said driving means includes a first elongated flexible member, a spool having a portion of a first diameter upon which an end of the first flexible member is wound and a second portion of lesser diameter, a second flexible member having one end wound upon the second portion of the spool, manually variable braking means, means for coupling the extending ends of the flexible members to the line-indicating member and to the braking means, and constant force means for driving the line-indicating member.

12. In a reading-training device comprising a line-indicating member and means for progressively driving the line-indicating member over successive lines of printed material, the improved construction characterized by a coupling between the line-indicating member and a portion of the driving means including a first elongated flexible member, a spool having a portion of a first diameter upon which an end of the first flexible member is wound and a second portion of lesser diameter, a second flexible member having one end wound upon the second portion of the spool, one of the extending ends of the flexible members being connected to the line-indicating member and the other extending end being connected to said portion of the driving means.

13. In a reading-training device comprising a line-indicating member and means for progressively driving the line-indicating member over successive lines of printed material, the improved construction including a spool, an elongated member wound upon the spool and having the extending end thereof connected to the line-indicating member, means for applying a constant force to the line-indicating member to move the line-indicating member along the direction of extension of said end of the flexible member, manually variable braking means, and a speed-changing coupling between the spool and the braking means.

14. In a reading-training device comprising an elongated horizontal line-indicating member and means for driving the line-indicating member downwardly over successive lines of reading material placed thereunder at manually selectable constant speeds, the improvement wherein said driving means comprise a single constant-force spring connected to an end of the line-indicating member and extending downward to urge the line-indicating member downward, and a single braking means including a flexible member coupled to the same end of the line-indicating member and extending upward to restrain the downward motion, the points of coupling of the spring and the braking means to the line-indicating member being in vertical alignment, so that the line-indicating member is urged to the horizontal position by the tension of the driving means, and the driving means is entirely at one side of the path of the line-indicating member.

15. In a reading-training device comprising an elongated horizontal line-indicating member and means for driving the line-indicating member downwardly over successive lines of reading material placed thereunder at manually selectable constant speeds, the improvement wherein said driving means comprises a single constant-force spring extending vertically upward along the edge of the path of the line-indicating member and having its extending end secured to a lateral end of the line-indicating member, means at the same side of the path of the line-indicating member for varying the mechanical load on the spring to vary the drive speed, and a vertically extending guide track at one end of the line-indicating member interengaged with said end of the line-indicating member to maintain the horizontal position thereof throughout its path of motion, the location of the driving means and load-varying means minimizing friction on the guide track due to torque on the line-indicating member.

16. A reading device comprising a side member, a line-indicating member extending transversely in only one direction from the side member and being adapted to move from the top portion to the bottom portion thereof over a path defining a reading area, a spool mounted at one end of the side member, a constant force spring having one end portion wound upon the spool and another portion extending along the side member and coupled to the end of the line-indicating member, braking means, and an elongated member extending along the side member coupling the line-indicating member and the extending portion of the spring to the braking means, so that the line-indicating member is progressed over the reading area adjacent to the side member at constant speed and constitutes the only portion of the device obstructing the reading area.

17. A reading device comprising a side member, a line-indicating member adapted to move from the top to the bottom of the side member to indicate successive lines, spools rotatably mounted at the ends of the side member on rotational axes perpendicular to the plane of motion of the line-indicating member, elongated members wound upon the spools and having ends extending along the side member and connected to the line-indicating member, constructed and arranged to wind the lower elongated member upon its spool to drive the line-indicating member, braking means, and a speed-changing coupling mechanism interconnecting the braking means and the upper spool.

18. A reading device comprising a line-indicating member and means for driving the line-indicating member downwardly over successive lines of reading material placed thereunder at manually selectable constant speeds, wherein the driving means comprises a spool, means for rotatably mounting the spool at the lower end of the path of the line-indicating member, a constant force spring pre-stressed to wind itself upon the spool and partially wound thereon, the outer end thereof extending upward and being coupled to the line-indicating member, and manually variable braking means coupled to the line-indicating member and the spring to retard the motion of the line-indicating member, whereby the line-indicating member is driven downwardly at constant speed by the spring, and the spring is automatically reset to its unwound condition for further operation in response to manual resetting of the line-indicating member to an upper position.

19. A reading device comprising a line-indicating member and means for driving the line-indicating member downwardly over successive lines of reading material placed thereunder, wherein the driving means comprises a spool, means for rotatably mounting the spool at the lower end of the path of the line-indicating member, a spring pre-stressed to wind itself upon the spool and partially wound thereon, the outer end thereof extending upward and being coupled to the line-indicating member, and braking means coupled to the line-indicating member and the spring to retard the motion of the line-indicating member, whereby the line-indicating member is driven downwardly by the spring and the spring is automatically reset to its unwound condition for further operation in response to manual resetting of the line-indicating member to an upper position.

References Cited in the file of this patent

UNITED STATES PATENTS

| | | |
|---|---|---|
| 1,587,881 | Webber | June 8, 1926 |
| 1,587,886 | Whitmore | June 8, 1926 |
| 1,869,790 | Wolf | Aug. 2, 1932 |
| 1,879,501 | Rigler | Sept. 27, 1932 |
| 1,988,973 | Shroitman | Jan. 22, 1935 |
| 2,098,020 | Wheeler | Nov. 2, 1937 |
| 2,265,924 | Oerter et al. | Dec. 9, 1941 |
| 2,305,993 | Ramsey | Dec. 22, 1942 |
| 2,632,258 | Erickson | Mar. 24, 1953 |
| 2,662,306 | McMaster | Dec. 15, 1953 |
| 2,662,307 | Simpson | Dec. 15, 1953 |